Patented Aug. 24, 1926.

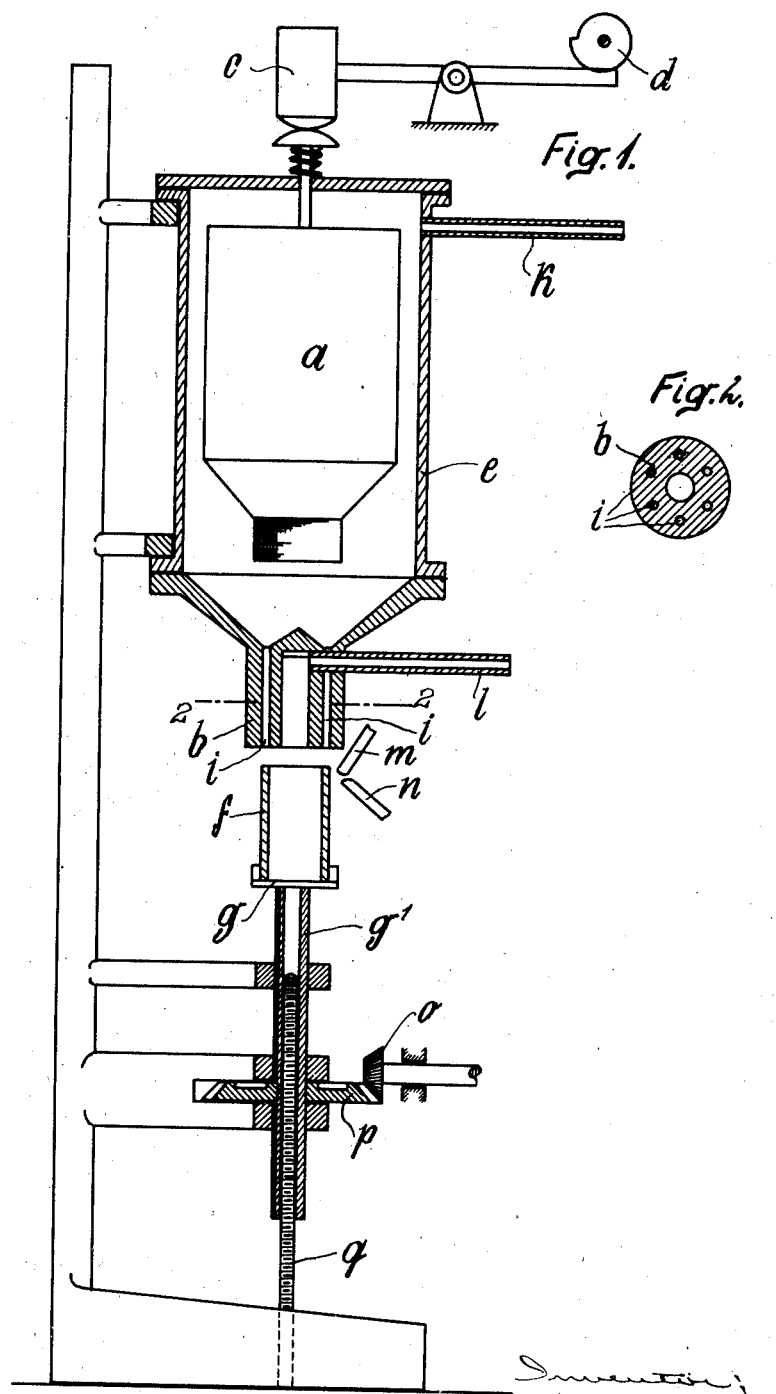

1,597,293

UNITED STATES PATENT OFFICE.

OTTO RUFF, OF BRESLAU, GERMANY.

MODE OF MAKING SINTERED HOLLOW BODIES.

Application filed December 30, 1922, Serial No. 610,040, and in Germany January 24, 1922.

The raw materials, for instance silicon dioxide, alumina or zirconium oxide, which by a sintering or smelting process are to be transformed into extremely fireproof bodies, have been worked upon up to the present time either according to any of the cold working-processes, which are known in the ceramic industry, and thereupon burned in ceramic ovens, or the raw-material has been melted on the circumference of suitable bodies, which are heated electrically, so as to bring the raw-material into the form of a hollow body, which thereupon is brought into the right shape by drawing, grinding and other finishing processess, or the raw-material has been melted on a core made out of the same material and thereupon it is treated and finished together with the core in similar way, as it has been said before.

As to the practical execution of those processes, it must be said that for reasons connected with the burning treatment it is extremely difficult in the first mentioned working process, to obtain goods which are free from fissures. In both the first and the second-mentioned process the manufactured goods in general will not keep gas tight, and in all three processes it is extremely difficult to produce sufficiently uniform and in a sufficiently large space, the very high temperatures which are necessary during the working processes.

Those difficulties are overcome by the present invention, which consists therein, that the bodies to be manufactured are built up free and self-supporting within the highly heated space by strewing the fireproof materials on a supporting base, which is moved as circumstances require.

According to this new manufacturing process the raw-material is not melted on a solid core, of the same material as the raw-material and which has a certain fixed shape, but the raw-material is melted on a base, which can be selected to suit the particular case, both regarding its nature and regarding its form, and the produced hollow body is formed so as to be free within the kiln, and is independent of the supporting base.

In order to carry out this new working process, very different kinds of apparatus may be used, which are chosen according to the requirements of the individual case. For example I have shown in the drawings a device to be used, if hollow bodies of cylindrical shape are to be manufactured according to the invention.

In the drawings:—

Figure 1 shows a vertical section through the apparatus used in the manufacture of cylindrical bodies;

Figure 2 shows a horizontal section according to line 2—2 in Fig. 1.

The receptacle $a$ hangs down from shaking devices $c$, $d$ within the closed vessel $e$, which is provided with a burner $b$, having outlet-nozzle-bores $i$; and out of the receptacle $a$ the raw-material falls constantly and uniformly through the nozzle-bores $i$, on the upper brim of the tube $f$, which is being manufactured by the process of melting the raw-material. The base $g$ of the tube $f$ rests on the hollow spindle $g'$, which is slowly rotated by the bevel-gearing $p$, $o$, the bevelled-wheel $p$, which turns the spindle $g'$, being at the same time slidable on the spindle $g'$. The hollow spindle $g'$ has an inner thread which is in engagement with the outer thread of the central spindle $q$, which causes the rotating hollow spindle $g'$ and the base $g$ to be lowered, as the cylinder $f$ grows by the melting on of the raw-material.

The oxygen to be used in the blast-pipe burner $b$, is introduced through the pipe $k$, and it is mixed with the other gas, such as coal-gas, hydrogen or acetylene, which is introduced through the pipe $l$, at the mouthpiece of the burner $b$.

$m$, $n$ are the poles of an electric arc-lamp-burner to head the upper brim of the tube $f$, in order to assist the melting-on of the powdered raw-material which is being dropped on it.

If suitable means are provided for movements of the base-plate $g$ bodies of any desired shape can be manufactured left open or closed. In this manufacturing process the nature of the base-plate $g$ has only an inferior importance.

The bodies for instance, which are manufactured according to this invention out of pulverized quartz, are free of all fissures, gas-tight, and extremely uniform and equal as to their walls.

I claim:—

1. A process for manufacturing highly fire-proof hollow bodies in a sintering or melting process, which comprises building up the wall of the hollow body lengthwise, while said body is free and self-supporting within the heating zone by strewing the finely divided fire-proof material on the end of said body, which is being moved on a correspondingly moved base plate.

2. A process of forming a tubular hollow body which comprises passing finely divided refractory solid material, with a current of one of the gases from which a hot flame is to be formed, into the said flame, in a downward direction, whereby the particles of such solid become heated to a high temperature, directing the flame downwardly toward the end of a tubular structure being formed, whereby the highly heated particles are caused to adhere upon the end of said tubular structure, giving the tubular structure a rotary motion, and gradually lowering the tubular body as it grows at the upper end.

3. A process of forming a tubular hollow body which comprises passing finely divided refractory solid material, with a current of one of the gases from which a hot flame is to be formed, into the said flame, in a downward direction, whereby the particles of such solid become heated to a high temperature, directing the flame downwardly toward the end of a tubular structure being formed, whereby the highly heated particles are caused to adhere upon the end of said tubular structure, heating the material deposited on the upper end of said tubular structure by the flame of gases burning in oxygen and also by an electric arc sufficiently to completely sinter the same to said tube end, giving the tubular structure a rotary motion and gradually lowering the tubular body as it grows at the upper end.

In testimony whereof I affix my signature.

Dr. OTTO RUFF.